United States Patent
Shih

(10) Patent No.: US 11,448,529 B2
(45) Date of Patent: Sep. 20, 2022

(54) OPTICAL ROTARY ENCODER

(71) Applicant: NATIONAL CHUNG-HSING UNIVERSITY, Taichung (TW)

(72) Inventor: Hsi-Fu Shih, Taichung (TW)

(73) Assignee: NATIONAL CHUNG-HSING UNIVERSITY, Taichung (TW)

( * ) Notice: Subject to any disclaimer, the term of this patent is extended or adjusted under 35 U.S.C. 154(b) by 176 days.

(21) Appl. No.: 17/247,141

(22) Filed: Dec. 1, 2020

(65) Prior Publication Data
US 2021/0172766 A1 Jun. 10, 2021

(30) Foreign Application Priority Data
Dec. 4, 2019 (TW) .................................. 108144385

(51) Int. Cl.
*G01D 5/347* (2006.01)
*G01D 5/38* (2006.01)

(52) U.S. Cl.
CPC ....... *G01D 5/3473* (2013.01); *G01D 5/34792* (2013.01); *G01D 5/38* (2013.01)

(58) Field of Classification Search
CPC .... G01D 5/3473; G01D 5/34792; G01D 5/38; G01D 5/34715
See application file for complete search history.

(56) References Cited

U.S. PATENT DOCUMENTS

| | | | | |
|---|---|---|---|---|
| 5,251,012 A * | 10/1993 | Riegger | ................ | H03M 1/245 356/617 |
| 6,703,602 B1 * | 3/2004 | Hao | .................... | G01D 5/34746 250/237 R |
| 6,835,924 B2 * | 12/2004 | Kawano | .................... | G01D 5/38 250/237 G |
| 2005/0168757 A1 * | 8/2005 | Benner | .............. | G01D 5/34715 356/616 |
| 2012/0072169 A1 * | 3/2012 | Gribble | .............. | G01D 5/34715 702/150 |

FOREIGN PATENT DOCUMENTS

| | | | | |
|---|---|---|---|---|
| CN | 1538149 A | 10/2004 | | |
| CN | 100395513 C | 6/2008 | | |
| DE | 102006011540 A1 * | 8/2007 | ............. | G01D 5/347 |
| JP | 2008116342 A | 5/2008 | | |
| TW | 201928303 A | 7/2019 | | |

OTHER PUBLICATIONS

English machine translation of DE-102006011540-A1 (Year: 2007).*
Search Report appended to an Office Action, which was issued to Taiwanese counterpart application No. 108144385 by the TIPO dated Mar. 26, 2020, with an English translation thereof.
Chia-Yi Chiu, "Study of the Diffractive Optical Encoder with Multiple Encoding Tracks", Abstract, Figures 3-4, 3-5, 3-18, Table 2-1, Lines 3-12 on p. 18, Lines 2-8 on p. 29, Jul. 2017.

* cited by examiner

*Primary Examiner* — Dominic J Bologna
(74) *Attorney, Agent, or Firm* — MLO, a professional corp.

(57) ABSTRACT

An optical rotary encoder includes a code disk, a laser source unit, a focusing unit and a photodetector array. The focusing unit converts the laser beam emitted by the laser source unit into incident laser beams that have a plurality of light points respectively on code tracks of the code disk, such that the code disk modulates the incident laser beams to form optical code signals. The photodetector array receives and converts the optical code signals into electric code signals.

12 Claims, 13 Drawing Sheets

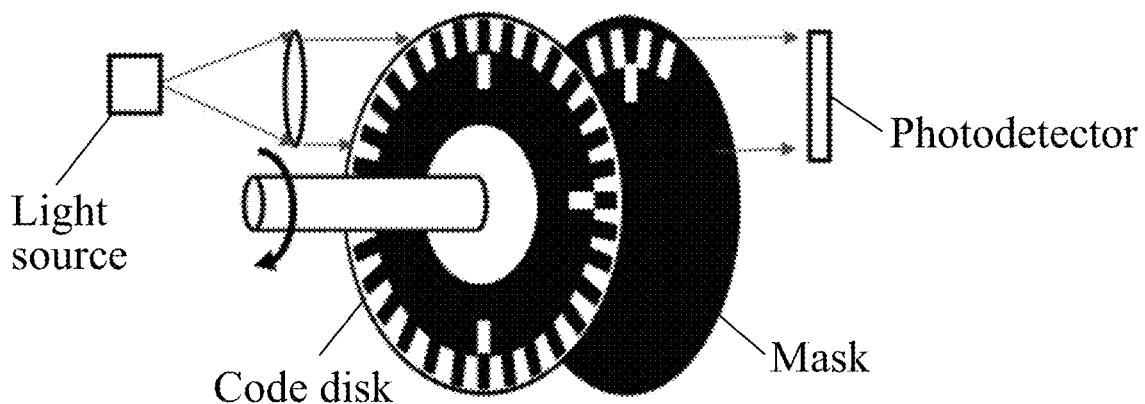
(a)
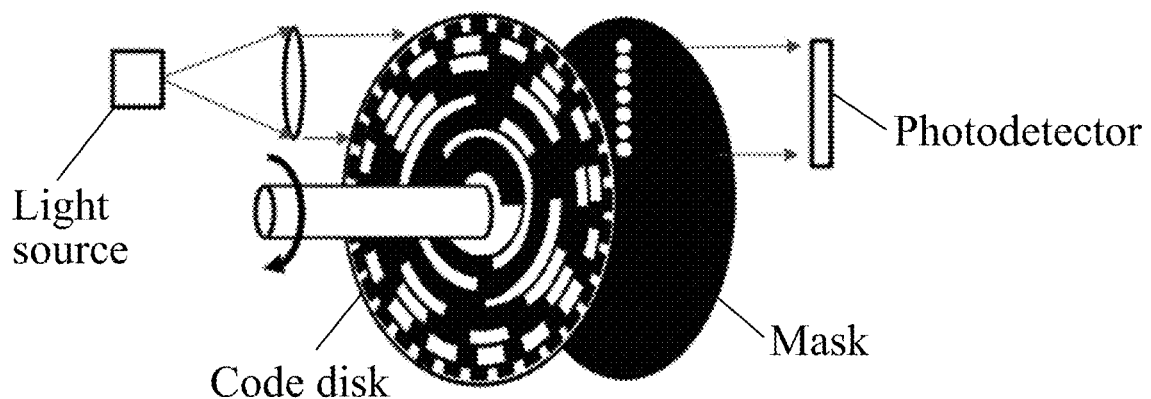
(b)
FIG.1
PRIOR ART

OPTICAL ROTARY ENCODER

CROSS-REFERENCE TO RELATED APPLICATION

This application claims priority of Taiwanese Invention Patent Application No. 108144385, filed on Dec. 4, 2019.

FIELD

The disclosure relates to an optical rotary encoder, and more particularly to an optical rotary encoder that uses laser to generate multiple beams that are respectively focused on multiple points, each of which is located on a respective code track of a code disk.

BACKGROUND

Rotary encoders are commonly used in motor control. Output feedbacks of rotary encoders enable various kinds of servo control that requires specific angular and/or positional accuracy. Rotary encoders can be divided into two main types: the incremental type and the absolute type. The incremental type can only calculate the variation of the rotation angle, while the absolute type can further provide the instantaneous absolute angle, which is critical for motor control systems that require precise positioning. Current designs of rotary encoders include mechanical rotary encoders that utilize physical contact, magnetic rotary encoders that use Hall sensors, capacitive rotary encoders that utilize capacitance change, and optical rotary encoders (ORE) that utilize optical beam modulation. The mechanical type, magnetic type and capacitive type are usually applied to motor control with lower speed and accuracy, and the optical type is usually used in the schemes that require higher speed and accuracy. In FIG. 1, part (a) shows a conventional incremental ORE, which uses periodic grating segmentation on the code disk to form a mask for the beam and to achieve signal modulation. Part (b) of FIG. 1 shows a conventional absolute ORE, which has multiple concentric tracks with different periodic grating segmentation. Such grating segmentation forms a mask for the beam and achieves absolute angular positioning.

Optical rotary encoders have been widely used in industries and have different technical specifications (e.g., form factor, turns, bits, etc.) adapted for different types of motors and applications. For precise motor control, the higher the bits, the more accurate the control and positioning are. Generally speaking, the number of bits refers to a sum of the optical resolvable bits and the bits that are further obtained by electronic sampling signals. For example, a 24-bit ORE may have 14-bit angular resolution per rotation (i.e., $2^{14}=16384$ scales, each corresponding to an angle separation of 0.022 degrees) provided by the optical signal, and additional 10 bits may be obtained by using the interpolation technique to divide the output sinusoidal wave, thereby achieving 24-bit resolution.

Due to the advancement of technology, there are strong demands for higher precision optical rotary encoders, which are being extensively researched and developed. Machine tools, automatic production equipment, semiconductor equipment, intelligent machines, robots, self-driving cars, etc., all require optical rotary encoders. In these industries, optical rotary encoders are not only essential, but also key to a complete system, which may use multiple optical rotary encoders at the same time. Light emitting diodes are usually used as a light source in high-end optical rotary encoders, and cooperate with a code disk that has a specific grating design to form a beam mask. However, in view of limitations imposed on the radius of the code disk, when the required angular resolution is very high, the area for each code region (e.g., a reflective region or a transmissive region that represents a bit value) would become so small that the light emitting diode, which is an incoherent light source and thus has limited optical resolution, is not suitable. Even if an optical technique such as optical interference is used, there is still a limitation.

Furthermore, conventional optical rotary encoders form a light pattern that covers all code tracks of the code disk to obtain positional data. However, when the required optical resolution becomes higher, area for each of the code regions (each representing a bit value) on the code disk will become smaller (e.g., entering micrometer sized level). Since the code regions are densely arranged, the code disk resembles a grating that induces optical diffraction. If the light illuminated on the code disk covers multiple code tracks and code regions, unnecessary diffraction orders with different intensities may be induced and make the resultant signal rays interfered with other diffraction orders.

FIG. 2 shows a conventional optical rotary encoder that uses a technique as disclosed in Taiwanese Patent Publication No. TW201816366, proposing to use a laser diode (LD, not shown) to emit, onto a code disk 112, a laser beam 123 that passes through a focusing lens 117, which is specifically designed using freeform surface technology. A light pattern 128 of the convergent beam (i.e., the laser beam 123 that has passed through and been converted by the focusing lens 117) is distributed linearly on a grating pattern on the code disk 112 and covers multiple code tracks. After being diffracted by the grating, the resultant light spots 126 that serve as encoded signals are received by an 8×4 photodetector (PD) array 122. However, such design has some drawbacks, such as: the light utilization efficiency of the diffraction is low; processing required to manufacture the focusing lens 117 is not easy; precise alignment as many as thirty-two photodetectors on the PD array 122 may be difficult; and interference between different diffraction orders may be severe. Most importantly, the need for sufficient diffraction angle results in a small width of the code regions of the code disc 112 that form the grating pattern, making it necessary to use a direct writer to manufacture the code disk, which is expensive and not easy.

SUMMARY

Therefore, an object of the disclosure is to provide an optical rotary encoder that can form multiple light points respectively on the code tracks of the code disk to obtain high optical resolution.

According to the disclosure, the optical rotary encoder includes a code disk, a laser source unit, a focusing unit and a photodetector array. The code disk includes a plurality of code tracks that are concentric. The laser source unit is configured to emit a source laser beam. The focusing unit is disposed to receive the source laser beam, and is configured to convert the source laser beam into incident laser beams that have a plurality of light points respectively on the code tracks of the code disk, such that the code disk modulates the incident laser beams to form optical code signals. The optical code signals are composed of a plurality of optical code components that respectively correspond to the incident laser beams. The photodetector array includes a plurality of photodetectors that are disposed to receive the optical code signals, that respectively correspond to the optical code components, and that are configured to convert the optical code signals into electric code signals.

BRIEF DESCRIPTION OF THE DRAWINGS

Other features and advantages of the disclosure will become apparent in the following detailed description of the embodiment(s) with reference to the accompanying drawings, of which:

FIG. 1 is a schematic diagram illustrating a conventional incremental optical rotary encoder in part (a) and a conventional absolute optical rotary encoder in part (b);

DETAILED DESCRIPTION

Figure 2:
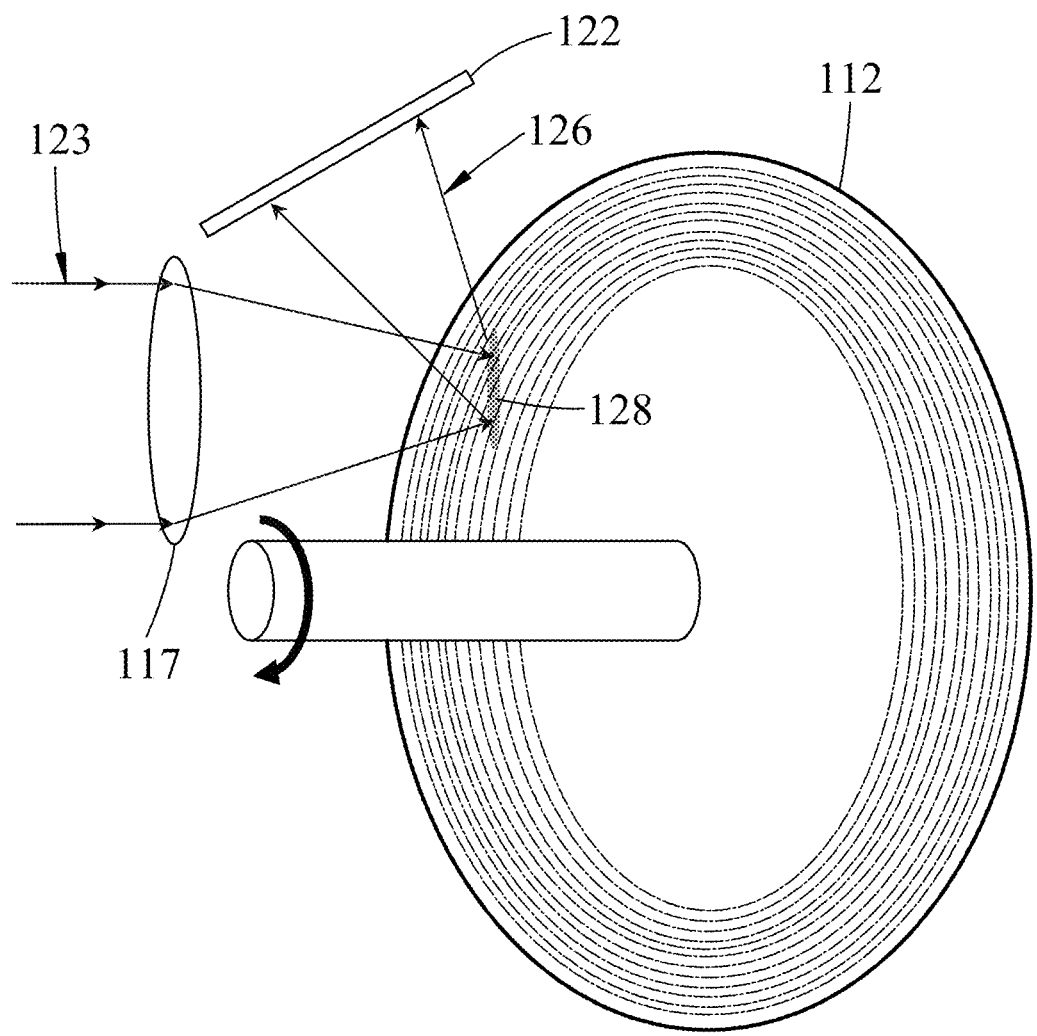
FIG. 2 is a schematic diagram illustrating a conventional optical rotary encoder that uses a laser source.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
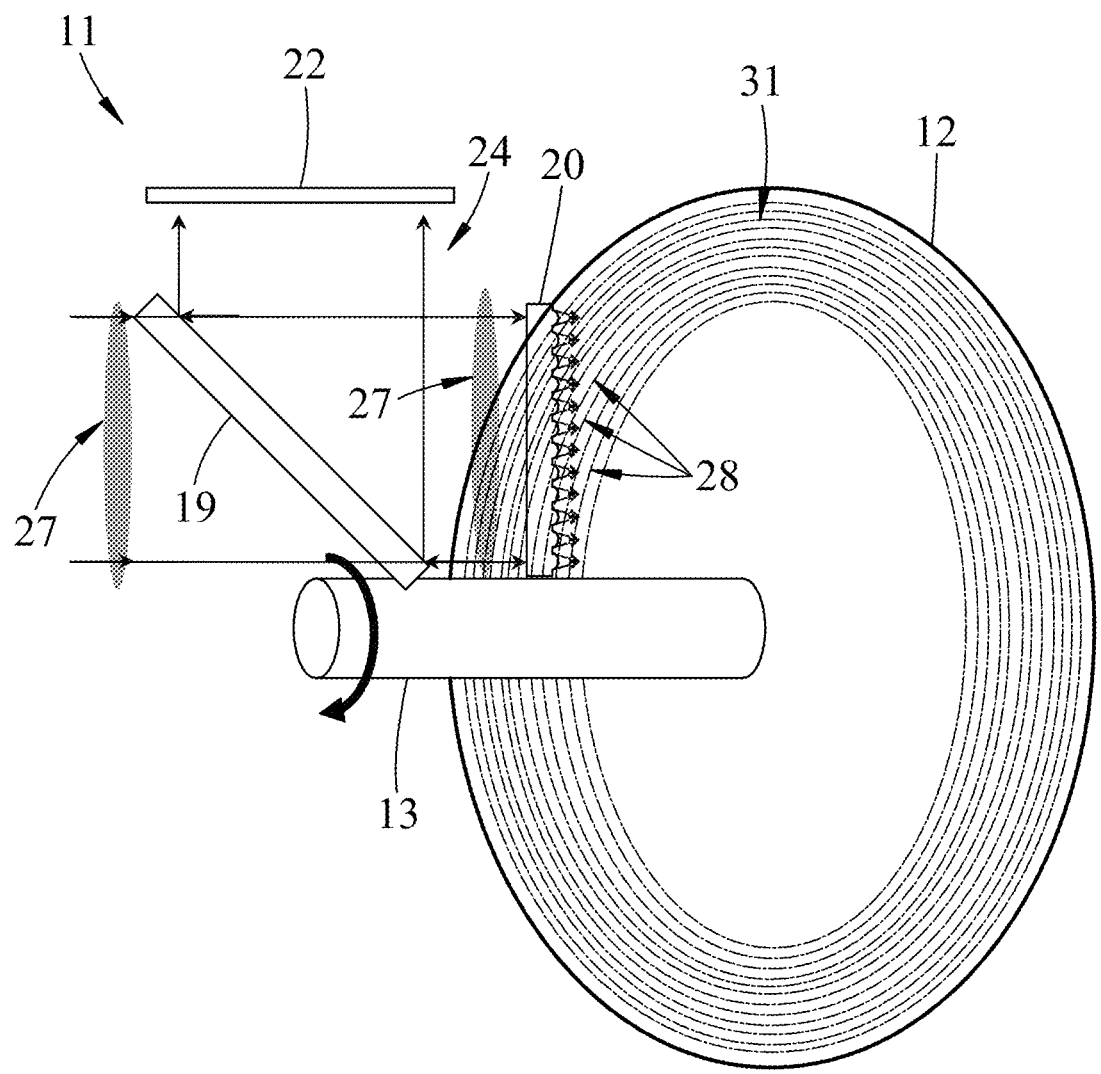
FIGS. 3 and 4 are schematic diagrams illustrating a first embodiment of an optical rotary encoder according to this disclosure.
Figure 4:
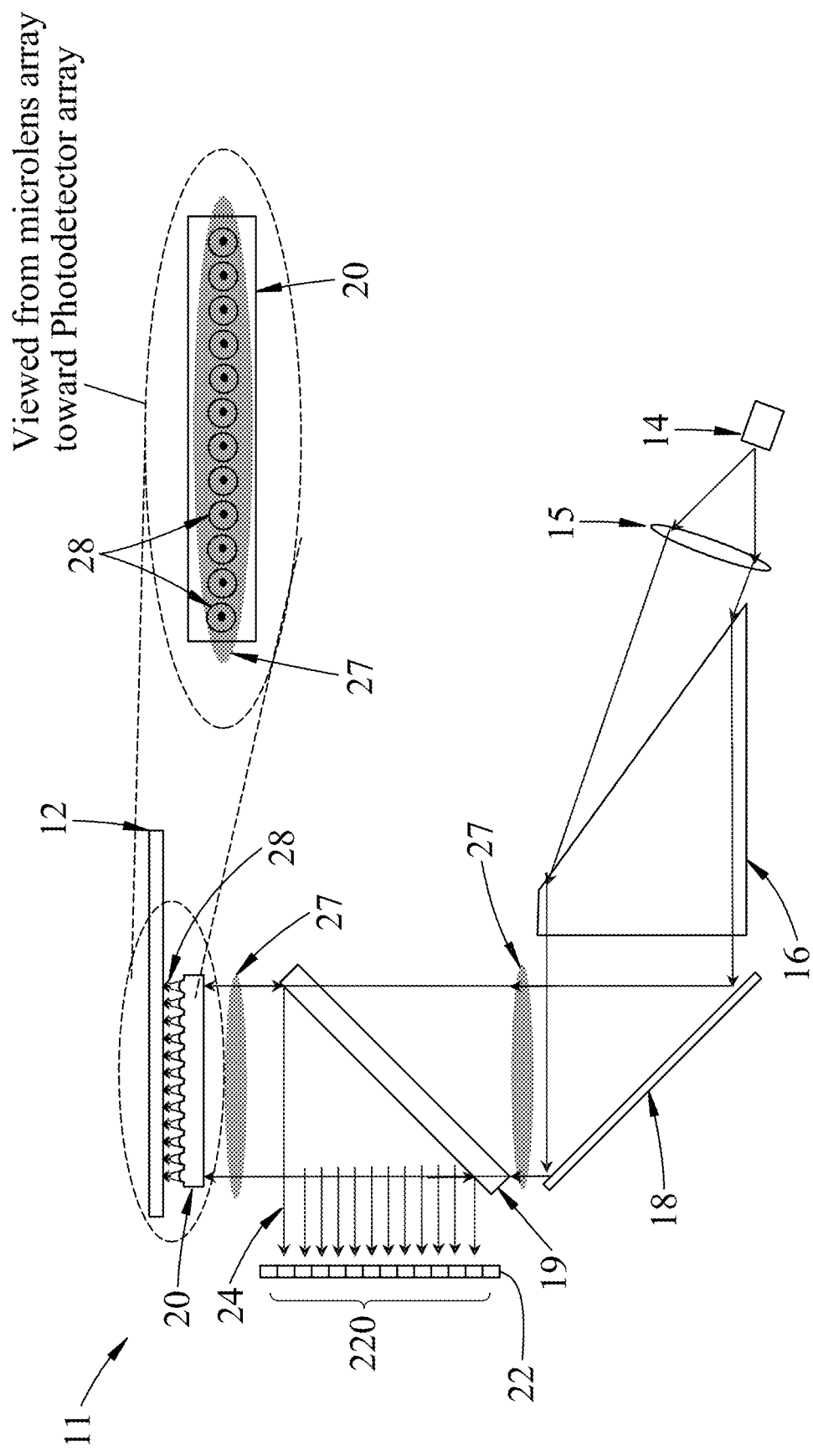

Referring to FIGS. 3 and 4, a first embodiment of an optical rotary encoder 11 according to this disclosure is shown to include a code disk 12, a shaft 13 that extends through the code disk 12, a laser source unit that includes a laser source 14 and a collimator 15, a focusing unit that includes a beam shaper 16, a reflector 18, a beam splitter 19 and a microlens array 20, and a photodetector array 22. In this embodiment, the optical rotary encoder 11 is exemplified as an absolute optical rotary encoder that has an optical resolution of 14 bits, but this disclosure is not limited to such. Any design that is founded upon the principles of the proposed embodiments of this disclosure falls within the scope of this disclosure.

Figure 5:
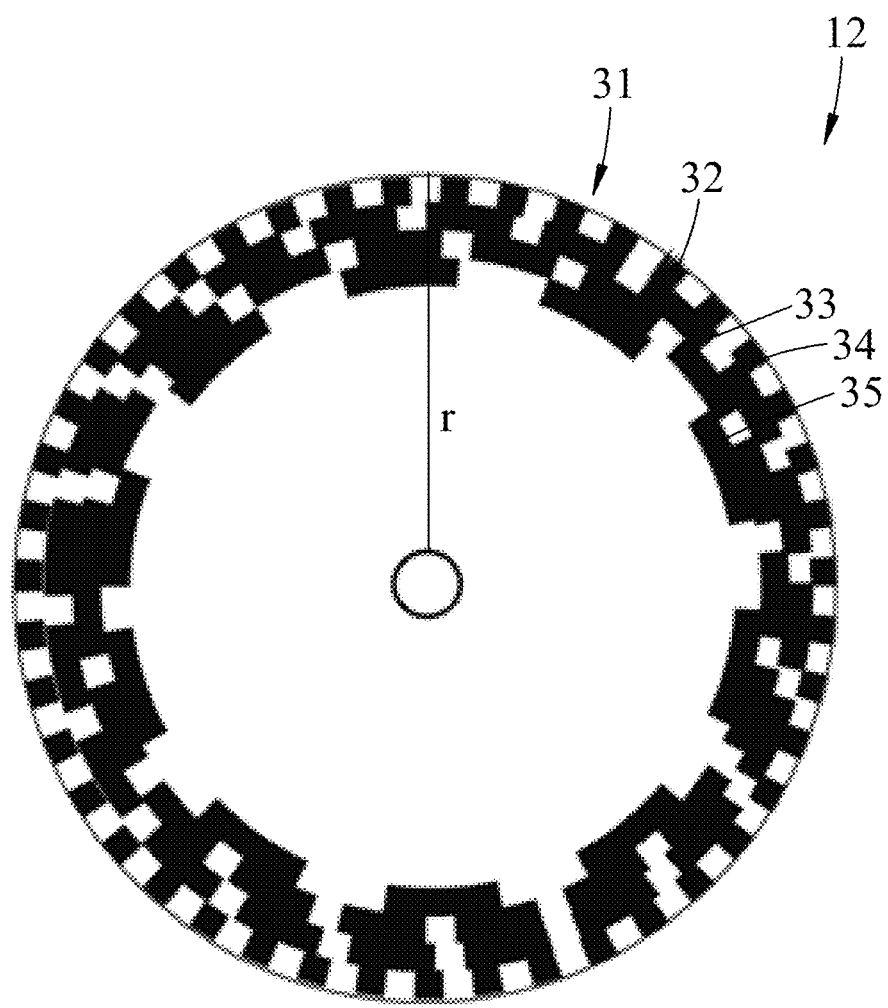
FIG. 5 is a schematic diagram illustrating a top view of a code disk of the first embodiment.
Figure 6:
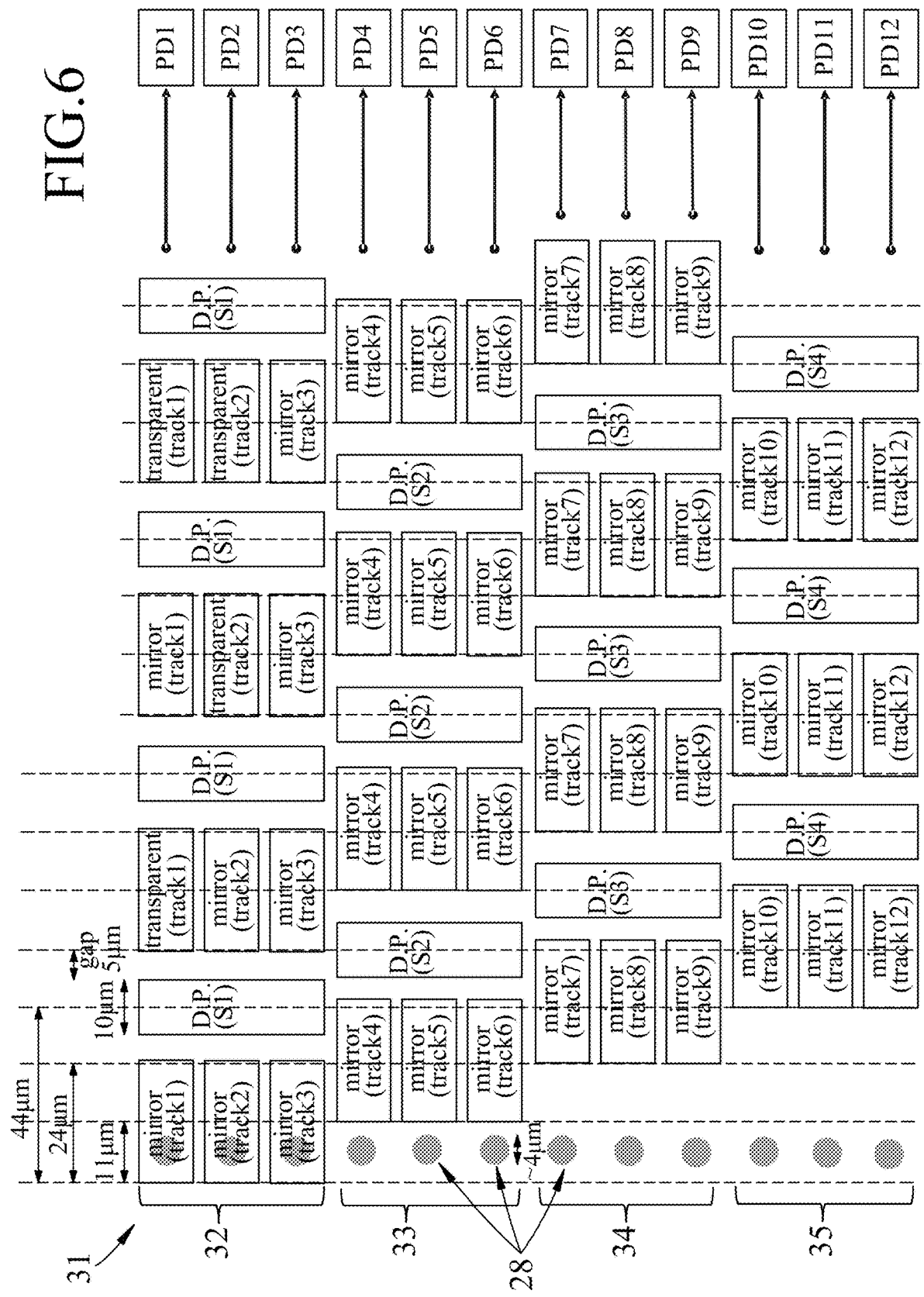
FIG. 6 is a schematic diagram illustrating arrangement of coding regions of the code disk of the first embodiment.

Referring to FIGS. 5 and 6, the code disk 12 includes a plurality of code tracks 31 (e.g., track 1 to track 12 in FIG. 6) that are concentric. In this embodiment, the outermost code track (e.g., track 1) represents the least significant bit, and the innermost code track (e.g. track 12) represents the most significant bit, but this disclosure is not limited to such. Each of the code tracks 31 includes a plurality of code regions. Each code region may be made reflective (e.g., the regions marked "mirror" in FIG. 6) or transparent to represent a bit value of "0" or "1". The code regions of the code tracks form code patterns of the code disk 12. In this embodiment, the code disk 12 includes twelve code tracks 31.

Referring to FIGS. 3 and 4 again, the laser source 14 emits a laser beam (referred to as source laser beam hereinafter) for receipt by the collimator 15. In this embodiment, the laser source 14 is realized using laser diodes (LD), but this disclosure is not limited in this respect. The laser source 14 is a coherent light source that favors obtaining higher optical resolution. The collimator 15 of the laser source unit receives and collimates the laser beam emitted by the laser source 14 to make the source laser beam have parallel rays. The use of the collimator 15 can reduce energy loss resulting from divergence of the laser beam, thereby enhancing utilization efficiency of light. In this embodiment, the source laser beam may have a wavelength between 400 nm and 800 nm, which is advantageous in better optical resolution than other wavelengths.

The focusing unit receives the source laser beam (with parallel rays), and converts the source laser beam into incident laser beams to be provided to the code disk 12. The incident laser beams have a plurality of light points 28 respectively on the code tracks 31 of the code disk 12, such that the code disk 12 modulates the incident laser beams to form optical code signals 24. The optical code signals 24 are composed of a plurality of optical code components that respectively correspond to the incident laser beams with light points 28.

In detail, the beam shaper 16 receives the source laser beam, and shapes the source laser beam into an oval-shaped laser beam. In practice, the beam shaper 16 may be an anamorphic prism that can adjust a ratio of lengths of major and minor axes of the distribution of the intensity of light, so as to shape the incoming light into the desired circular or oval light pattern to effectively concentrate the energy of the laser beam. The reflector 18 receives and reflects the oval-shaped laser beam 27 toward the beam splitter 19 that is disposed to permit passage of the oval-shaped laser beam 27 thus reflected. The oval-shaped laser beam 27 passes through the beam splitter 19 and reaches the microlens array 20. The microlens array 20 is composed of a plurality of microlenses that are disposed to form the incident laser beams with light points 28. In this embodiment, the microlens array 20 includes twelve microlenses that respectively correspond to twelve code tracks 31 and that are arranged in a straight line. The microlenses focus the oval-shaped laser beam 27 to obtain the incident laser beams that form twelve light points 28 respectively on the twelve code tracks 31 of the code disk 12. Then, some of the incident laser beams that illuminate the reflective code regions are reflected back to the beam splitter 19 along the respective original optical paths, and are then reflected by the beam splitter 19 toward the photodetector array 22. Those of the incident laser beams that are reflected by the code disk 12 form the optical code signals 24. More specifically, a reflected incident laser beam represents one type of optical code component (e.g., representing a bit value of "1"), a non-reflected incident laser beam represents the other type of optical code component (e.g., representing a bit value of "0"), and the reflected part and the non-reflective part of the incident laser beams cooperatively form the optical code signals 24.

The photodetector array 22 includes a plurality of photodetectors 220 that are disposed to receive the optical code signals 24, that respectively correspond to the optical code components, and that convert the optical code signals 24 into electric code signals.

In this embodiment, the code tracks 31 of the code disk 12 are divided into multiple track groups. For each of the track groups, the code regions of one of the code tracks 31 thereof are aligned with the code regions of any other one of the code tracks 31 thereof in radial directions of the code disk 12. That is, the code regions of the different code tracks 31 in the same track group are aligned with each other. On the other hand, for any two of the track groups, the code regions of any of the code tracks 31 of one of the track groups are misaligned with the code regions of any of the code tracks 31 of the other one of the track groups in the radial directions of the code disk 12. That is, the code regions of the code tracks 31 in one track group are displaced relative to the code regions of the code tracks 31 in another track group in the radial directions of the code disk 12. FIGS. 5 and 6 exemplarily show the arrangement of the code regions on the code disk 12 that has a radius of r of this embodiment. The twelve code tracks 31 that are disposed on an outer edge portion of the code disk 12 are divided into four track groups 32, 33, 34, 35. Taking a commonly used dimension of the ORE as an example where the code disk 12 has a diameter of 58 mm (useful coding area radius r=28.5 mm), the circumference of the code disk 12 should be divided into $2^{12}$ coding sections, each having a width of about 44 μm, out of which 24 μm is for the code region, 10 μm is for a differential phase region (denoted as "D.P." and made reflective in FIG. 6, but may be made transparent in other embodiments), and the remaining 10 μm is for gaps each between the differential phase region and an adjacent one of the code regions. In a case that the microlens array 20 has a numerical aperture (NA) of 0.1, and the laser source 14 is realized using red laser diodes, the light points 28 formed on the code disk 12 may have a full width at half maximum (FWHM) of 4 μm, and would be easily located respectively at the code tracks 31 with a defocus tolerance of ±70 μm (on the basis that the light points 28 are still smaller than 10 μm in diameter when defocused). Each of the track groups 32-35 includes three code tracks 31, and any two adjacent track groups (i.e., groups 32 and 33, groups 33 and 34, and groups 34 and 35) have a relative displacement of 11 μm (i.e., ¼ the width of the coding section) in a clockwise direction. Such relative displacements can generate four additional phase variations that contribute to additional optical resolution of two bits, so the optical rotary encoder 11 in this embodiment achieves 14 bits of the optical resolution in total.

Figure 7:
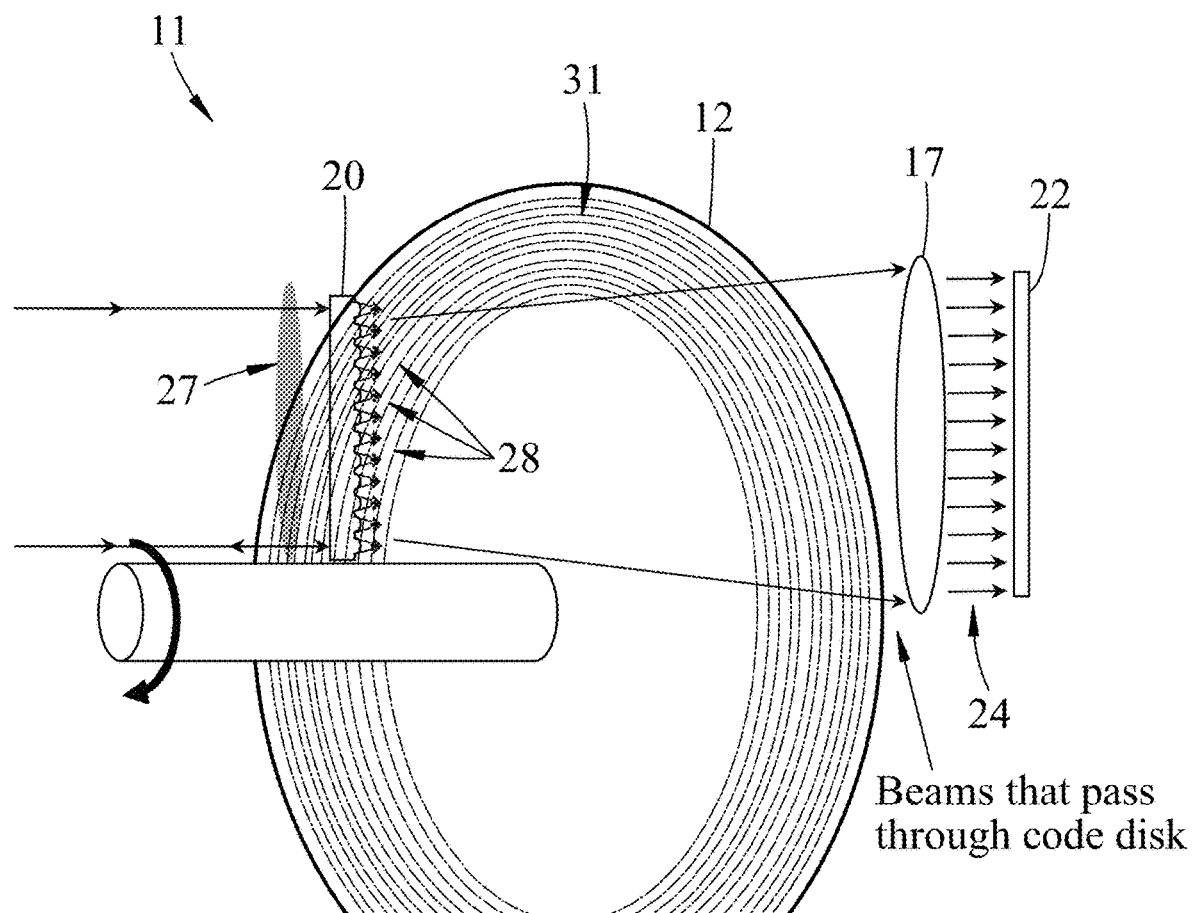
FIGS. 7 and 8 are schematic diagrams illustrating a second embodiment of an optical rotary encoder according to this disclosure.
Figure 8:
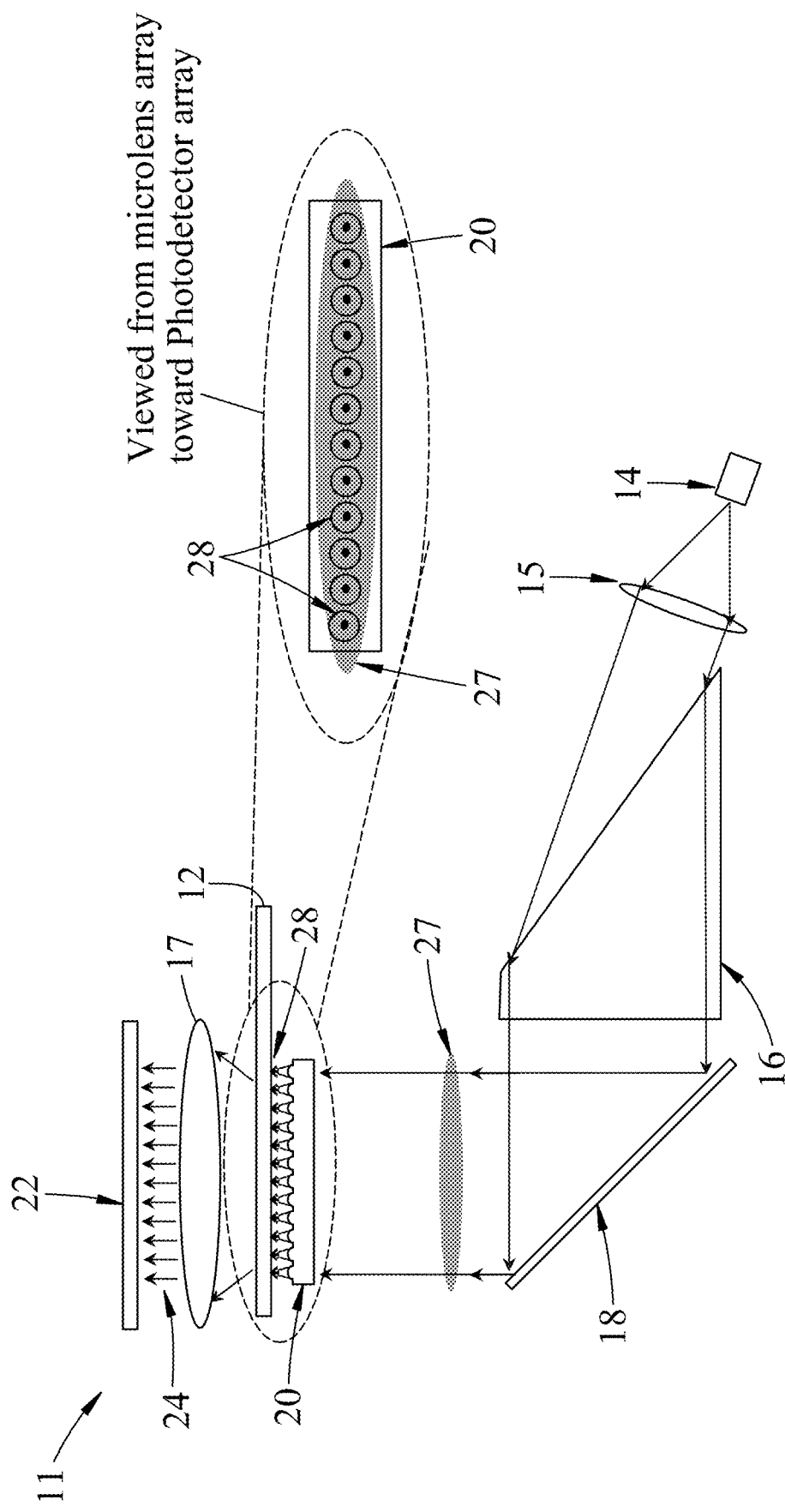

FIGS. 7 and 8 exemplarily illustrate a second embodiment of the optical rotary encoder 11 according to this disclosure. The second embodiment differs from the first embodiment in that, instead of the reflected part of the incident laser beams, those of the incident laser beams that pass through the code disk 12 form the optical code signals 24, and the photodetector array 22 is disposed to receive said those of the incident laser beams that pass through the code disk 12. In detail, the focusing unit of the second embodiment is different from that of the first embodiment in that it omits the beam splitter 19 of the first embodiment (see FIG. 4), and the optical rotary encoder 11 thereof further includes a focusing lens 17. After the oval-shaped laser beam 27 is converted into the incident laser beams by the microlens array 20, the incident laser beams have the light points 28 respectively on the code tracks 31, and those of the incident laser beams that pass through the transparent code regions of the code disk 12 are collected and focused by the focusing lens 17 for receipt by the photodetector array 22. Those of the incident laser beams that pass through the code disk 12 (e.g., representing the bit value of "1") and those of the incident laser beams that do not pass through the code disk 12 (e.g., representing the bit value of "0") cooperatively form the optical code signals 24 that are received by the photodetector array 22.

Figure 9:
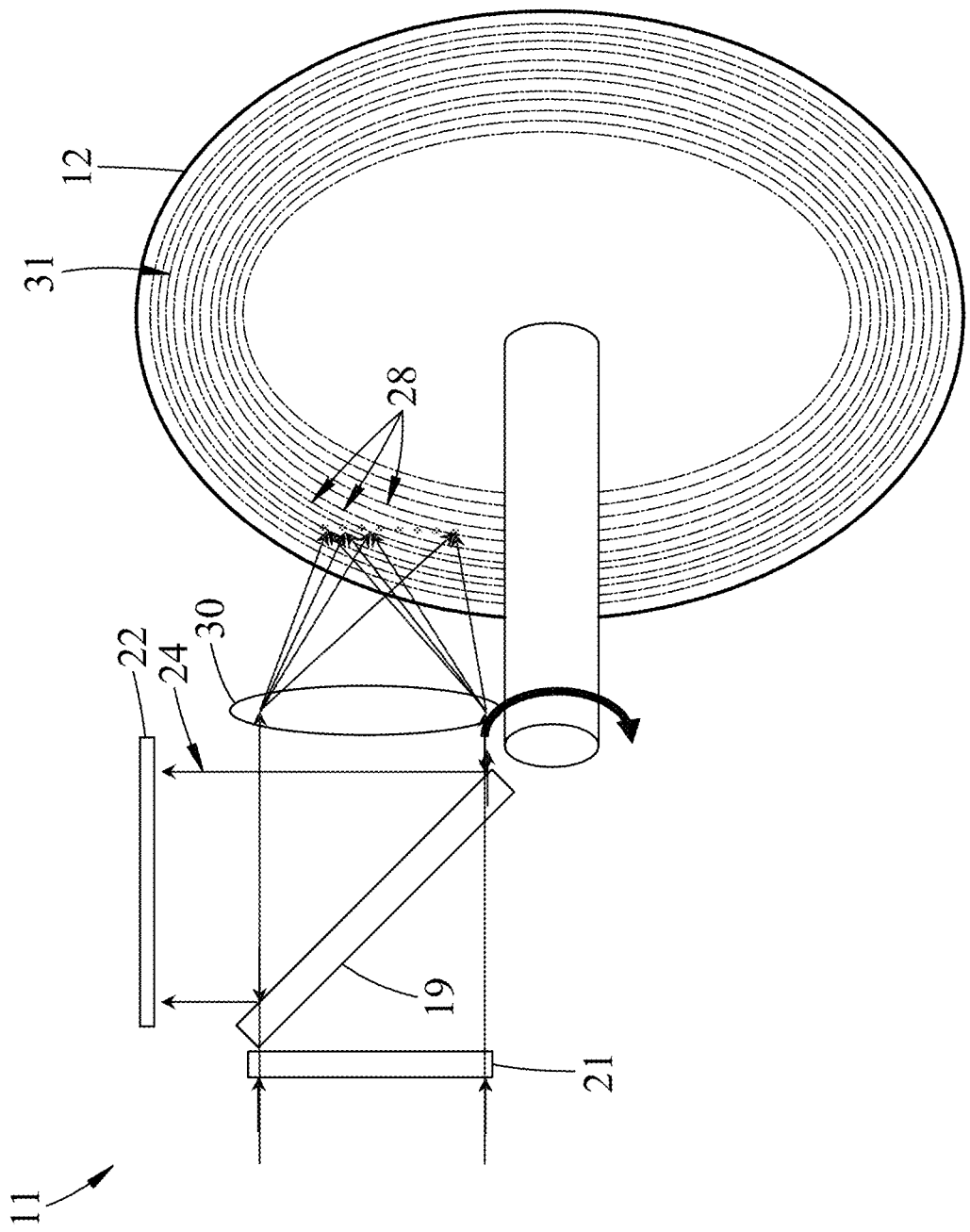
FIGS. 9 and 10 are schematic diagrams illustrating a third embodiment of an optical rotary encoder according to this disclosure.
Figure 10:
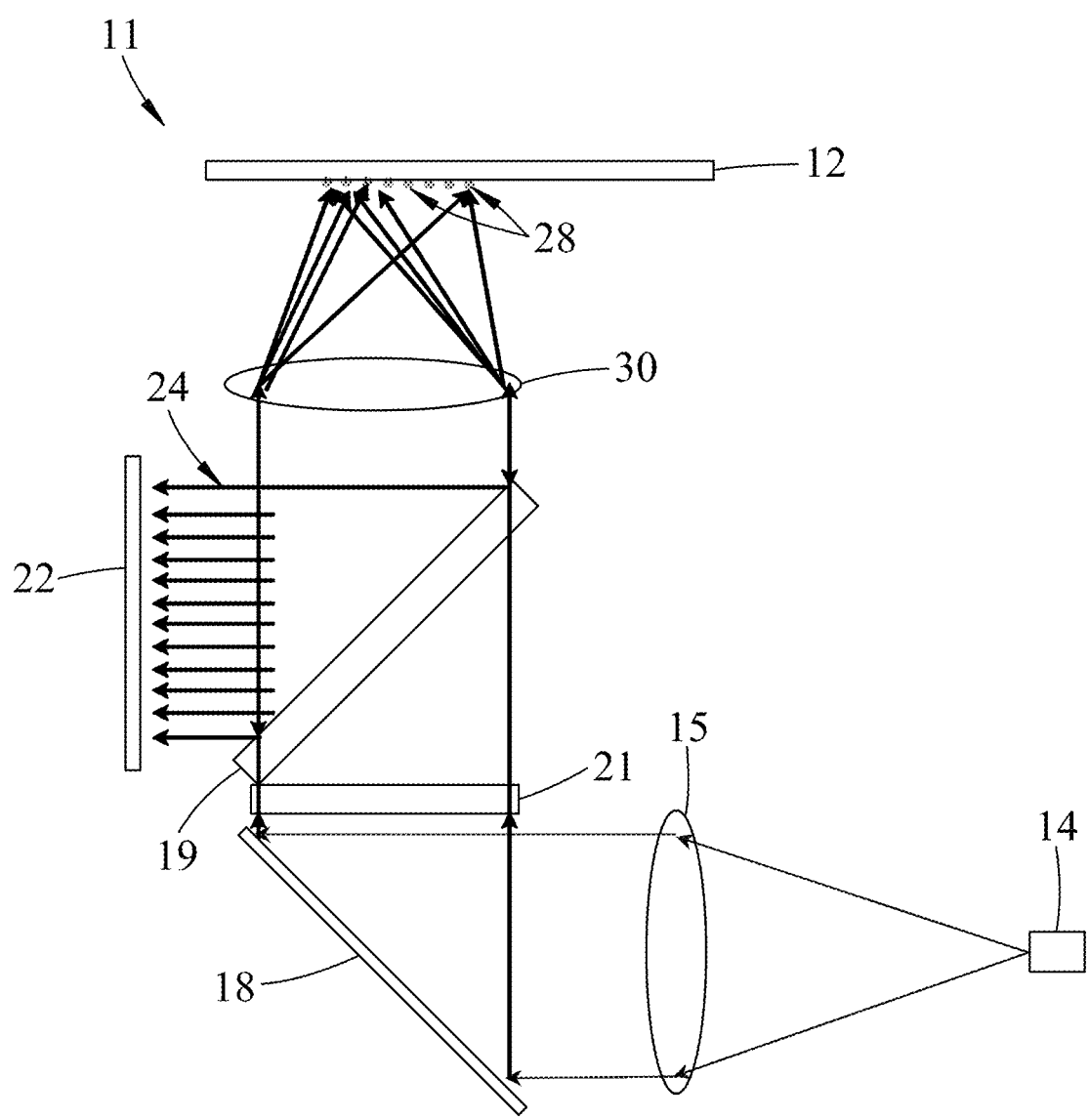
Figure 11:
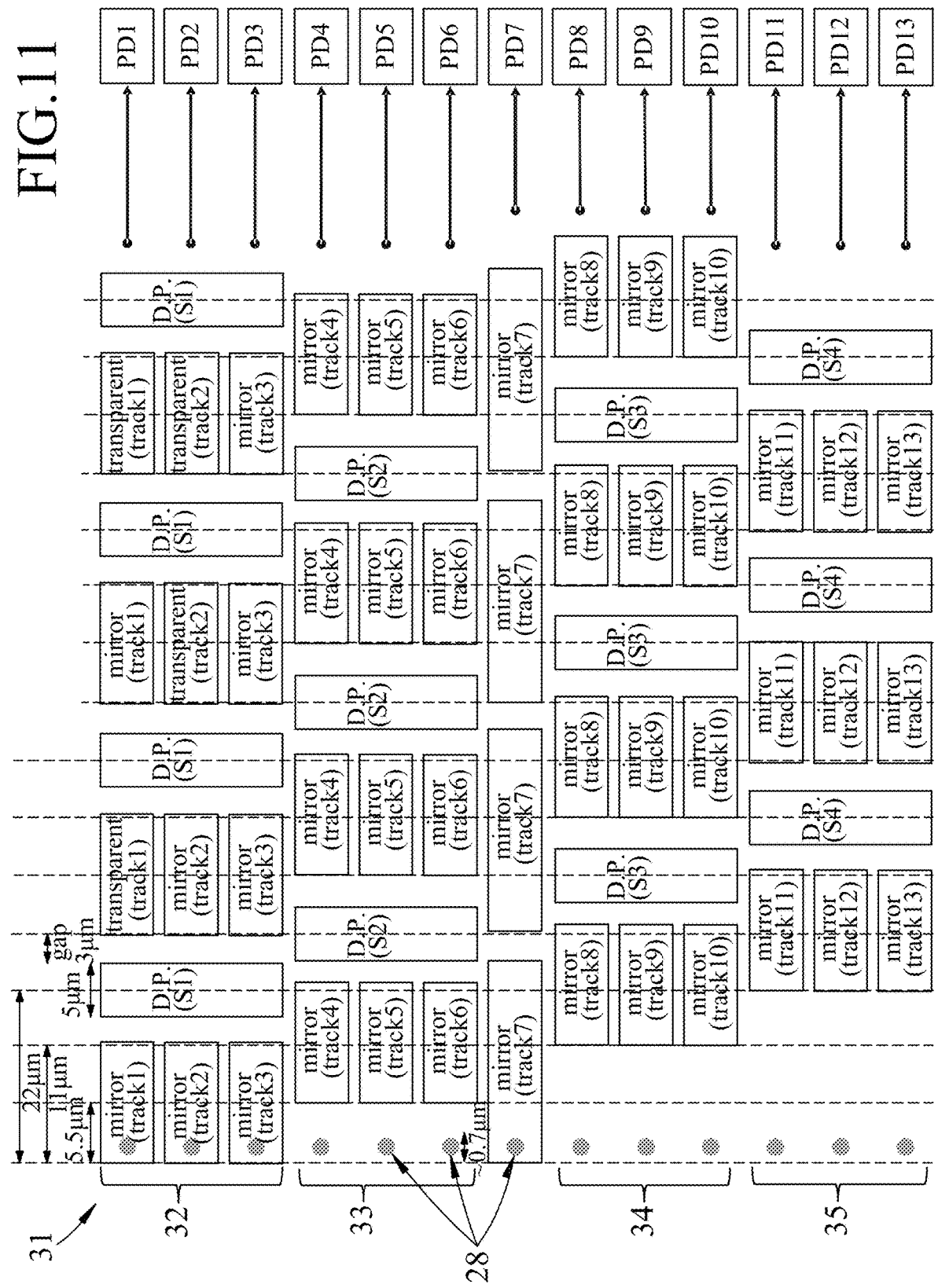
FIG. 11 is a schematic diagram illustrating arrangement of coding regions of the code disk of the third embodiment.

When it is desired to further promote the optical resolution while the code disk 12 remains having the radius of 28.5 mm, such as to 15 bits that require thirteen code tracks for the code disk 12, the width of each coding section will be reduced to 22 μm. Accordingly, the light points 28 formed by the focused incident laser beams must be reduced in size, so the numerical aperture of the microlens array 20 of the first and second embodiment must be higher. However, microlens arrays usually do not have high numerical apertures, and are often used for products that do not require precise focusing, such as light guide plates. As a result, the surface of commercially available microlens arrays are usually made with lower precision, resulting in lower focusing quality that is not good enough to obtain the sufficiently small light points 28 as are required by the optical rotary encoder 11 of this disclosure when higher optical resolution is to be achieved. On the other hand, it is also not easy to acquire a microlens array that has thirteen microlenses on the market. Therefore, FIGS. 9 and 10 exemplarily illustrate a third embodiment of the optical rotary encoder 11 according to this disclosure. In the third embodiment, the focusing unit includes a multiple-beam grating 21 and a single focusing lens 30 that has a high numerical aperture, and the microlens array and the beam shaper of the first and second embodiments are omitted. In this embodiment, the multiple-beam grating 21 that can generate a plurality (e.g., thirteen) of diffracted beams with equal light intensity may be manufactured using the design principle of the Dammann gratings. Additional two-bit optical resolution may be obtained by the relative displacements among the track groups as described in the first embodiment, so as to achieve the desired 15-bit optical resolution. The third embodiment exemplifies that the focusing lens 30 has a numerical aperture of 0.6, and the laser source 14 includes a laser diode that emits a laser beam of 660 nm in wavelength. The laser beam emitted by the laser source 14 is collimated by the collimator 15 to form the source laser beam, and the source laser beam is reflected by the reflector 18 toward the multiple-beam grating 21. The multiple-beam grating 21 receives the source laser beam thus reflected and induces diffraction of the source laser beam to form a plurality of diffracted laser beams (e.g., thirteen diffracted laser beams in this embodiment). The diffracted laser beams pass through the beam splitter 19 and reach the focusing lens 30. The focusing lens 30 receives and converts the diffracted laser beams into the incident laser beams that have the light points 28 (e.g., thirteen light points in this embodiment) respectively on the code tracks 31 of the code disk 12. Those of the incident laser beams that illuminate the reflective code regions of the code tracks 31 are reflected back to the beam splitter 19 along the respective original optical paths, and are then reflected by the beam splitter 19 toward the photodetector array 22 that includes thirteen photodetectors respectively corresponding to the thirteen code tracks 31 of the code disk 12 in this embodiment. Those of the incident laser beams that are reflected by the code disk 12 form the optical code signals 24. Referring to FIG. 11, the code disk 12 of the third embodiment is shown to include thirteen code tracks 31. Each coding section has a width of 22 μm, out of which 11 μm is for the code region, 5 μm is for a differential phase region (denoted as "D.P." and made reflective in FIG. 11, but may be made transparent in other embodiments), and the remaining 6 μm is for gaps each between the differential phase region and an adjacent one of the code regions. In a case that the focusing lens 30 has a numerical aperture of 0.6, the light points 28 formed on the code disk 12 may have a full width at half maximum of 0.6 μm, and would be easily located respectively at the code tracks 31 with a defocus tolerance of ±10 μm (on the basis that the light points 28 are still smaller than 5 μm in diameter when defocused). Specifically, the numerical aperture of the focusing lens 30 is proposed to range between 0.1 and 85. The higher the numerical aperture, the smaller the spot size of the result light points 28 formed by the focusing unit is.

Figure 12:
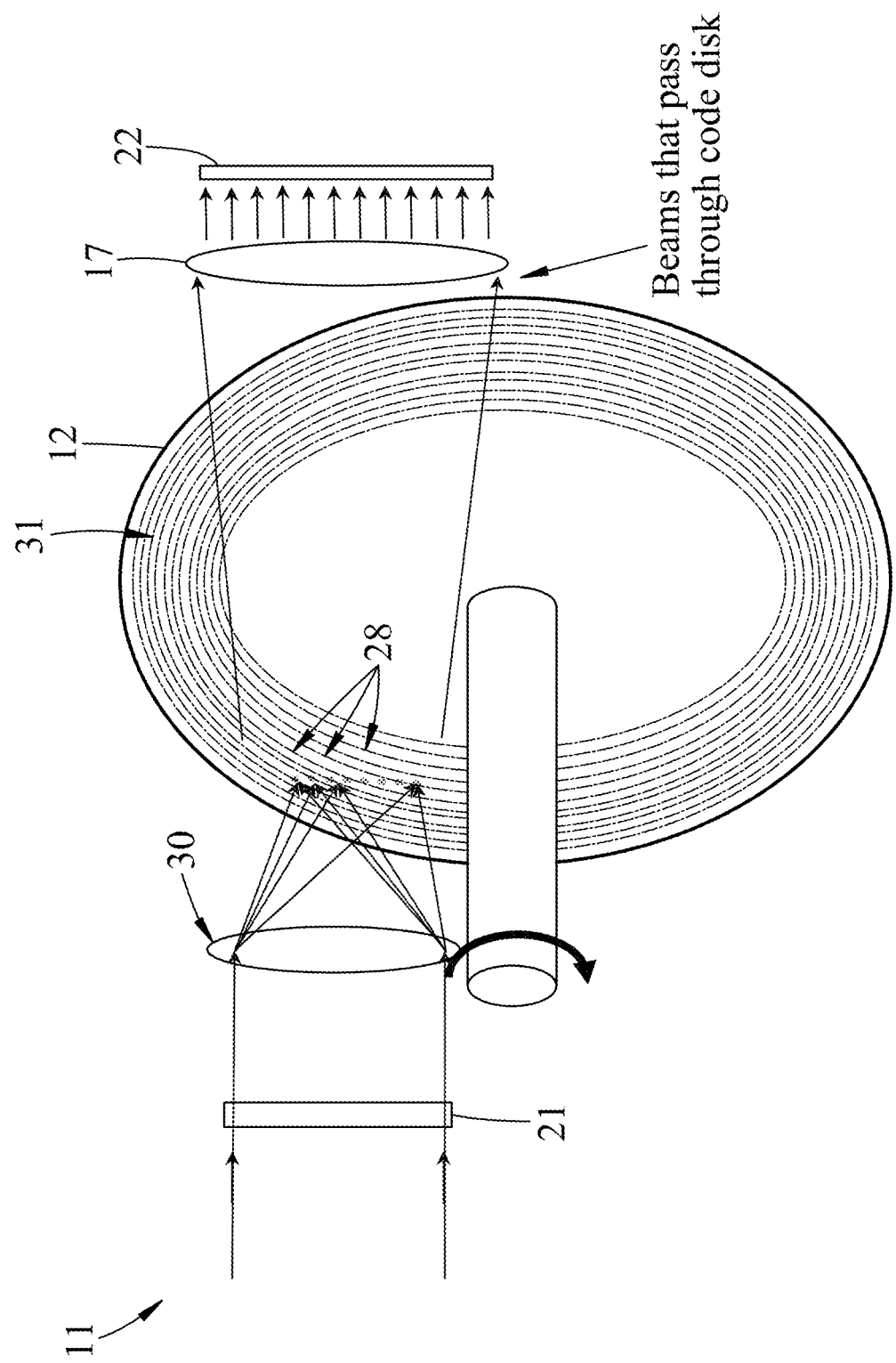
FIGS. 12 and 13 are schematic diagrams illustrating a fourth embodiment of an optical rotary encoder according to this disclosure.
Figure 13:
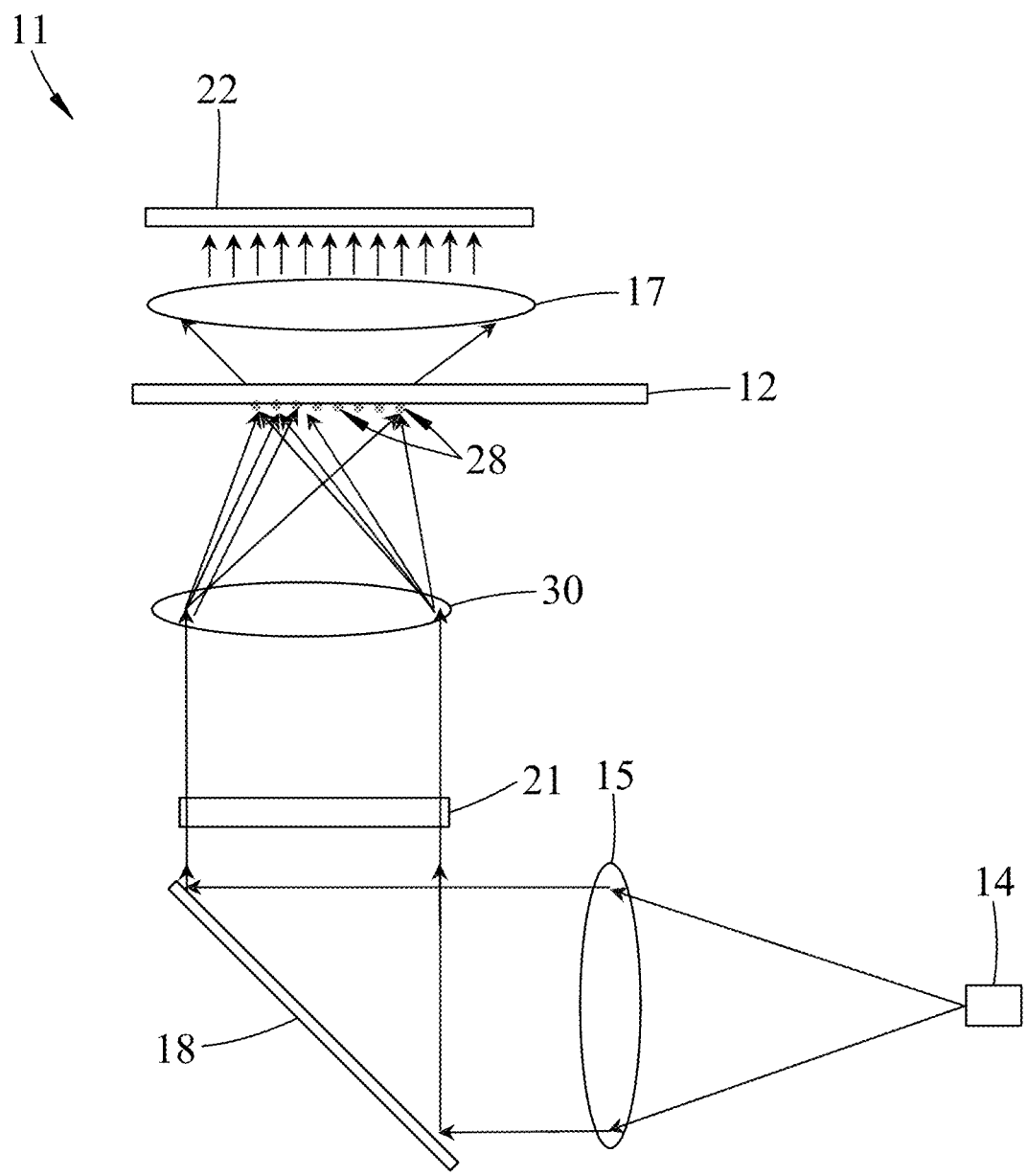

FIGS. 12 and 13 exemplarily illustrate a fourth embodiment of the optical rotary encoder according to this disclosure. The fourth embodiment differs from the third embodiment in that, instead of the reflected part of the incident laser beams, those of the incident laser beams that pass through the code disk 12 form the optical code signals 24, and the photodetector array 22 is disposed to receive said those of the incident laser beams that pass through the code disk 12. In detail, the focusing unit of the fourth embodiment is different from that of the third embodiment in that it omits the beam splitter 19 of the third embodiment (see FIGS. 9 and 10), and the optical rotary encoder 11 thereof further includes a focusing lens 17. The diffracted laser beams pass through the focusing lens 30 to generate the incident laser beams that have the light points 28 respectively on the code tracks 31, and those of the incident laser beams that pass through the transparent code regions of the code disk 12 are collected and focused by the focusing lens 17 for receipt by the photodetector array 22. Those of the incident laser beams that pass through the code disk 12 (e.g., representing the bit value of "1") and those of the incident laser beams that do not pass through the code disk 12 (e.g., representing the bit value of "0") cooperatively form the optical code signals 24 that are received by the photodetector array 22.

The embodiments of the disclosure include a focusing unit that converts the source laser beam into the incident laser beams that have multiple light points 28 respectively on the code tracks 31 of the code disk 12. Furthermore, each of the light points 28 only illuminates one of the code regions of the respective one of the code tracks, so optical interference among the resultant optical code components of the optical code signals 24 may be significantly reduced, thereby promoting the optical resolution of the optical rotary encoder 11. In addition, the use of the laser source unit that emits the coherent laser beam is also advantageous in promoting the optical resolution because the higher the coherence of the light beam, the smaller the spot size of the result light points 28 formed by the focusing unit is.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An optical rotary encoder, comprising:
   a code disk including a plurality of code tracks that are concentric;
   a laser source unit configured to emit a source laser beam;
   a focusing unit disposed to receive the source laser beam, and configured to convert the source laser beam into incident laser beams that have a plurality of light points respectively on said code tracks of said code disk, such that said code disk modulates the incident laser beams to form optical code signals, the optical code signals composed of a plurality of optical code components that respectively correspond to the incident laser beams; and
   a photodetector array including a plurality of photodetectors that are disposed to receive the optical code signals, that respectively correspond to the optical code components, and that are configured to convert the optical code signals into electric code signals.

2. The optical rotary encoder of claim 1, wherein said focusing unit includes a microlens array composed of a plurality of microlenses that are disposed to form the incident laser beams with the light points.

3. The optical rotary encoder of claim 2, wherein said laser source unit includes:
   a laser source that emits a laser beam; and
   a collimator disposed to receive the laser beam emitted by said laser source, and configured to collimate the laser beam received thereby to make the source laser beam have parallel rays.

4. The optical rotary encoder of claim 3, wherein said focusing unit further includes:
   a beam shaper disposed to receive the source laser beam, and configured to shape the source laser beam into an oval-shaped laser beam that is provided to said microlens array to form the incident laser beams with the light points.

5. The optical rotary encode of claim 4, wherein said photodetector array is disposed to receive those of the incident laser beams that are reflected by said code disk and that form the optical code signals, and said focusing unit further includes:
   a beam splitter disposed to receive the oval-shaped laser beam and those of the incident laser beams that are reflected by said code disk, and disposed to permit passage of the oval-shaped laser beam such that said microlens array receives and converts the oval-shaped laser beam into the incident laser beams with the light points, and to reflect those of the incident laser beams that are reflected by said code disk to said photodetector array.

6. The optical rotary encoder of claim 4, further comprising a focusing lens disposed to receive and focus those of the incident laser beams that pass through said code tracks and that form the optical code signals on said photodetector array.

7. The optical rotary encoder of claim 1, wherein said focusing unit includes a multiple-beam grating that is disposed to receive the source laser beam, and that is configured to induce diffraction of the source laser beam to form a plurality of diffracted laser beams; and
   a first focusing lens disposed to receive the diffracted laser beams, and configured to convert the diffracted laser beams into the incident laser beams with the light points.

8. The optical rotary encoder of claim 7, wherein said first focusing lens has a numerical aperture ranging between 0.1 and 0.85.

9. The optical rotary encoder of claim 7, wherein said photodetector array is disposed to receive those of the incident laser beams that are reflected by said code disk and that form the optical code signals, and said focusing unit further includes:
- a beam splitter disposed to receive the diffracted laser beams and those of the incident laser beams that are reflected by said code disk, and configured to permit passage of the diffracted laser beams such that said first focusing lens receives and converts the diffracted laser beams into the incident laser beams with the light points, and to reflect those of the incident laser beams that are reflected by said code disk to said photodetector array.

10. The optical rotary encoder of claim 7, further comprising a second focusing lens disposed to receive and focus those of the incident laser beams that pass through said code tracks and that form the optical code signals on said photodetector array.

11. The optical rotary encoder of claim 1, wherein the source laser beam has a wavelength between 400 nm and 800 nm.

12. The optical rotary encoder of claim 1, wherein each of said code tracks of said code disk includes a plurality of code regions, and said code tracks of said code disk are divided into multiple track groups;
- wherein, for each of the track groups, said code regions of one of said code tracks thereof are aligned with said code regions of any other one of said code tracks thereof in radial directions of said code disk; and
- wherein, for any two of the track groups, said code regions of any of said code tracks of one of the track groups are misaligned with said code regions of any of said code tracks of the other one of the track groups in the radial directions of said code disk.

* * * * *